United States Patent [19]
Goddard et al.

[11] Patent Number: 5,468,388
[45] Date of Patent: Nov. 21, 1995

[54] FILTER MODULE WITH DEGASSING FEATURE

[75] Inventors: Norman H. Goddard, Osterode; Peter Schaefer, Bilshausen, both of Germany

[73] Assignee: Sartorius AG, Germany

[21] Appl. No.: 263,798

[22] Filed: Jun. 21, 1994

[30] Foreign Application Priority Data

Jul. 1, 1993 [DE] Germany ................. 43 21 927.6

[51] Int. Cl.⁶ .................................................. B01D 63/00
[52] U.S. Cl. ........................... 210/321.75; 210/321.84; 210/321.6; 210/435; 210/436; 210/446; 210/451; 210/472; 96/155
[58] Field of Search .................. 210/321.6, 321.76, 210/321.84, 435, 436, 446, 451, 453, 472, 475; 96/155

[56] References Cited

U.S. PATENT DOCUMENTS

| | | | |
|---|---|---|---|
| 3,954,623 | 5/1976 | Hammer et al. | 210/436 |
| 4,225,440 | 9/1980 | Pitesky | 210/472 |
| 4,298,358 | 11/1981 | Ruschke | 210/436 |
| 4,356,012 | 10/1982 | Hofstetter | 210/472 |
| 4,572,724 | 2/1986 | Rosenberg et al. | 210/436 |
| 4,861,466 | 8/1989 | Leoncavallo et al. | 210/472 |
| 4,997,555 | 3/1991 | Church et al. | 210/436 |
| 5,362,406 | 11/1994 | Gsell et al. | 210/436 |

Primary Examiner—Ana M. Fortuna
Attorney, Agent, or Firm—Chernoff, Vilhauer, McClung & Stenzel

[57] ABSTRACT

There is disclosed a pressurizable filter module for aqueous media having a degassing feature, the improvement comprising the use of a hydrophobic membrane between the inlet plenum of the filter module and the pressure relief valve.

2 Claims, 1 Drawing Sheet

FILTER MODULE WITH DEGASSING FEATURE

BACKGROUND OF THE INVENTION

High purity filtration of aqueous media, such as in the fields of biotechnology, chemistry, electronics, pharmaceuticals and the food and beverage industries requires the use of sophisticated filter modules that are not only capable of a high degree of separation, but that will tend to prevent contamination of the environment, of the medium to be filtered, and of the filtrate. Because the degree of filtration achieved results in the removal of not only objectionable materials and microorganisms, but also of gases present in the medium to be filtered, and because commercial protocol calls for periodic checking of the integrity of the module, such modules are fabricated with the goal of withstanding a build-up of gas pressure and yet operate efficiently and be leakproof. However, as will be noted below, current technology has not yet been able to successfully achieve this goal.

Because the build-up of gas pressure within the filter module tends to reduce the effective surface area of the filter element of the module, gas pressure within the module must be periodically released. To be capable of periodically releasing this build-up of gas (often referred to as "degassing"), such filter units are often equipped with one or more pressure relief valves.

There are however, several drawbacks with the pressure release mechanisms that are currently available with known high purity filter modules. Specifically, for example, when the integrity of the module is checked by tests such as the bubble point, the pressure retention, or the diffusion tests, the module is rendered gas-tight and the inside is pressurized by means of gas-tight test apparatus such as that made and sold under the trade name "Sartocheck" by Sartorius AG of Goettingen, Germany. The pressurization causes at least a small amount of the aqueous medium to be filtered to leak from the pressure relief valve or valves. Such leakage causes contamination of the outside of the filter module housing, environmental pollution when hazardous materials are being filtered, and potential contamination of the inside of the module and hence of the filtrate by contact with microorganisms in the environment exterior to the module.

Accordingly, it is an object of the present invention to provide a pressurizable high purity filter module for filtering aqueous media which is leakproof during degassing and pressurized testing of the module, which in turn provides the advantages of security against contamination of the module itself, of the filtrate and of the medium to be filtered, and further provides security against environment pollution.

This object and others will be understood from the detailed description of the preferred embodiment of the present invention set forth below.

SUMMARY OF THE INVENTION

The essence of the present invention lies in the provision of a hydrophobic, gas-permeable and contamination-preventing membrane that separates a pressure relief valve from the inlet plenum of the filter module.

DETAILED DESCRIPTION OF THE INVENTION

Figure 1:
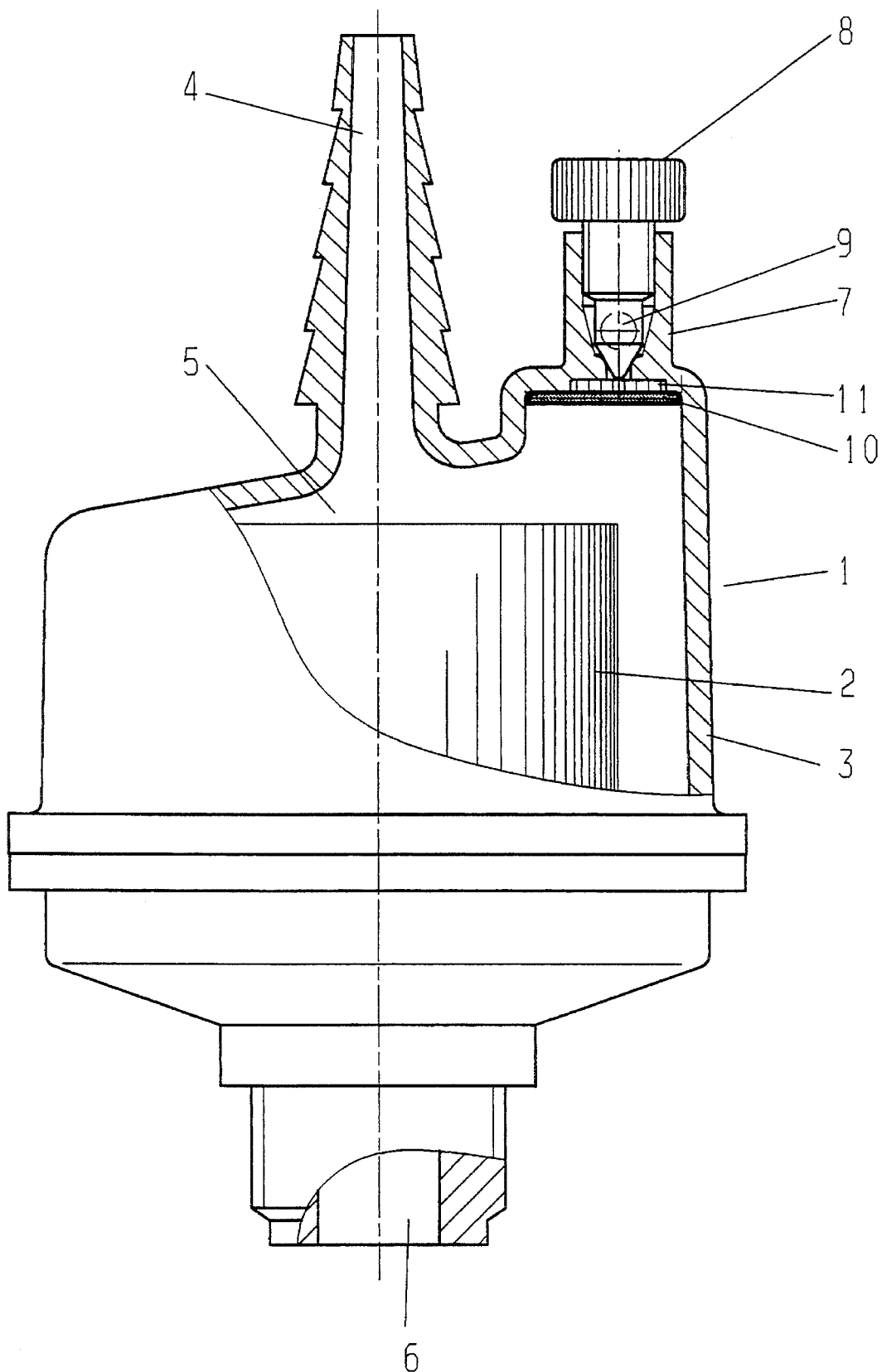
FIG. 1 is a vertical cross-sectional view of the filter module of the present invention.

Referring to the drawing, there is shown in FIG. 1 a filter module 1 comprising a conventional cartridge filter element 2 in a housing 3. The housing 3 includes an inlet 4 for the aqueous medium to be filtered, and inlet plenum 5, and an outlet port 6 for filtrate removal. The module is further equipped with a degassing fitting collectively comprising a valve seat 7, a pressure relief valve 8, a gas outlet port 9, a hydrophobic membrane 10 and an optional membrane support 11.

Note that such an arrangement results in the hydrophobic membrane 10 separating inlet plenum 5 from pressure relief valve 8. The hydrophobic membrane 10 is gas-permeable but substantially impermeable to aqueous media and is further substantially impermeable to particulates and microorganisms which could contaminate the inside of the filter module. The hydrophobic membrane 10 is preferably sealed to the inner side of the housing at its periphery, which may be accomplished by heat or pressure or the injection of a sealant or a combination of any of the three. The hydrophobic membrane 10 may optionally be supported by a membrane support element 11; double support is also possible, but not shown. Pressure relief valve 8 is operable to open or close gas outlet port 9, and the valve 8 may threadedly engage valve seat 7, or may be biased against the same by means of a spring.

Structurally, the hydrophobic membrane 10 may be porous, nonporous, woven or nonwoven fabric, so long as it has pores not larger than about 0.2 µm. Preferably the hydrophobic membrane is polymeric; especially preferred polymers are propylene, polyvinylidenefluoride, polytetrafluoroethylene and polysulfone.

In operation, the filter module of the present invention allows gas to continually move through the hydrophobic membrane 10 when the pressure relief valve 8 is open while particles or microorganisms which could cause contamination of the inside of the filter module cannot enter into the inlet plenum 5 of the housing 3. During the course of filtration, the aqueous medium to be filtered fills the entire inlet plenum 5 of the housing 3, permitting utilization of the entire surface area of the cartridge filter element 2. Because there is no build-up of gas pressure during filtration, cartridge filter element 2 maintains its full filtration capacity throughout the entire filtration process. Moreover, since the hydrophobic membrane 10 is substantially impermeable to the aqueous medium to be filtered, leakage of the aqueous medium is prevented. Accordingly, contamination of the outside of the housing 3 of the filter module 1 and pollution of the environment is prevented. In connection with the manual performance of any of the pressurized integrity tests on the filter module, the degassification arrangement is shut. Thus, by means of the activation of the gas relief valve 8 (which, by way of example, can be designed in a screw threaded form), the degassing opening is blocked so as to render the filter module gas-tight. For automatic operation of the integrity tests, such as with the "Sartocheck" gas testing apparatus, pressure relief valve 8 is opened and the gas testing apparatus is secured to the valve seat 7.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A pressurizable filter module for high purity filtration of aqueous media which is adapted for high pressure testing of its integrity, said module comprising a housing, a cartridge filter element, a liquid feed inlet port, a liquid feed inlet plenum, a liquid filtrate port, a gas-tight manually closeable degassing fitting, and a hydrophobic membrane between said inlet plenum and said degassing fitting, said hydrophobic membrane being secured on its periphery to said housing.

2. The module of claim 1 wherein said degassing fitting comprises a pressure relief valve in threaded engagement with a gas outlet port.

* * * * *